United States Patent
Ando et al.

(10) Patent No.: US 7,341,133 B2
(45) Date of Patent: Mar. 11, 2008

(54) HYDRAULIC CIRCUIT AND HYDRAULIC CONTROL UNIT FOR HYDRAULIC POWER TRANSMISSION

(75) Inventors: Masahiko Ando, Anjo (JP); Hideyuki Aoki, Anjo (JP); Hiroyuki Tsukamoto, Anjo (JP); Akira Fukatsu, Anjo (JP); Atsushi Mori, Anjo (JP); Akira Matsuo, Anjo (JP); Hideaki Furuta, Anjo (JP)

(73) Assignee: Aisin A W Co., Ltd. (JP)

( * ) Notice: Subject to any disclaimer, the term of this patent is extended or adjusted under 35 U.S.C. 154(b) by 191 days.

(21) Appl. No.: 11/200,232

(22) Filed: Aug. 10, 2005

(65) Prior Publication Data
US 2006/0032720 A1 Feb. 16, 2006

(30) Foreign Application Priority Data
Aug. 10, 2004 (JP) ............................. 2004-232906
Aug. 10, 2004 (JP) ............................. 2004-232907

(51) Int. Cl.
*F16H 61/14* (2006.01)
(52) U.S. Cl. ...................................... 192/3.3; 192/3.29
(58) Field of Classification Search .................. 192/3.3
See application file for complete search history.

(56) References Cited

U.S. PATENT DOCUMENTS 2,965,202 A * 12/1960 Christenson ................. 192/3.3
3,068,974 A * 12/1962 Jandasek ..................... 192/3.3

FOREIGN PATENT DOCUMENTS

JP 2641419 2/1985

* cited by examiner

*Primary Examiner*—Rodney H. Bonck
(74) *Attorney, Agent, or Firm*—Bacon & Thomas, PLLC

(57) ABSTRACT

A hydraulic power transmission is provided with a frictional engagement element as a lock-up clutch between a hydraulic power transmission chamber, housing a pump impeller and a turbine runner, and a servo oil chamber of the lock-up clutch. A lock-up oil passage that supplies lock-up hydraulic pressure to the servo oil chamber is connected to a hydraulic pressure supply circuit that is used in common with a circulation oil passage that supplies hydraulic pressure for circulation to the hydraulic power transmission chamber. An orifice is disposed in the circulation oil passage. It is thus possible to perform lock-up with different supply pressures. A common oil supply for the lock-up oil passage and the circulation oil passage is provided, for example, by disposing a converting circuit that adapts an oil passage connection to hydraulic transmissions with different types of lock-up clutches.

11 Claims, 5 Drawing Sheets

HYDRAULIC CIRCUIT AND HYDRAULIC CONTROL UNIT FOR HYDRAULIC POWER TRANSMISSION

CROSS-REFERENCE TO RELATED APPLICATION

The present application claims, under 35 USC 119(a), priority of Japanese Patent Application No. 2004-232906 filed on Aug. 10, 2004 and of Japanese Patent Application No. 2004-232907 filed on Aug. 10, 2004 the teachings of which, including their specifications, drawings and abstracts are incorporated herein by reference in their entirety.

BACKGROUND OF THE INVENTION

1. Field of the Invention

The present invention relates to a hydraulic circuit for a hydraulic power transmission such as a fluid coupling or a torque converter, and more particularly, relates to control of supply of hydraulic pressure to a hydraulic power transmission provided with a lock-up clutch.

2. Description of the Related Art

Hydraulic power transmissions generally have a pump impeller and a turbine runner disposed opposite each other within a hydraulic power transmission chamber, and a lock-up clutch disposed therebetween for directly connecting the pump impeller to the turbine runner. Such an arrangement is intended to improve torque transmission efficiency in an area where torque-transmitting fluid has low slippage. Lock-up clutches can be roughly divided into two types. In one type of lock-up clutch, a flexible single-disc clutch fixed to a turbine hub engages and disengages the case of the hydraulic power transmission. In the other type, a multi-disc friction engagement element is disposed between the turbine runner and the case of the hydraulic power transmission. The friction engagement element is engaged and disengaged by operation of a servo piston disposed within a servo oil chamber that is provided isolated from the hydraulic power transmission chamber within the hydraulic power transmission case.

The single-disc type of clutch establishes a lock-up OFF state when oil is supplied to the hydraulic power transmission chamber from an oil passage (a lock-up OFF oil passage), between the clutch plate and the hydraulic power transmission case, and the oil is discharged from a lock-up ON oil passage. Conversely, a lock-up state is established when the lock-up clutch is engaged by supply of hydraulic pressure to the hydraulic power transmission chamber side from the lock-up ON oil passage. The hydraulic pressure in this type of hydraulic power transmission is supplied via two oil passages that alternately feed and discharge hydraulic pressure, namely, the lock-up ON oil passage and the lock-up OFF oil passage.

However, a simple lock-up control such as performed for the single-disc clutch cannot be applied in the other type, wherein a multi-disc friction engagement element is engaged and disengaged by a servo piston, because the servo piston is pushed inside the servo oil chamber when hydraulic pressure is supplied to the hydraulic power transmission chamber. For this reason, the supply of hydraulic pressure to the hydraulic power transmission in the related art is achieved by two oil passages that alternately feed and discharge hydraulic pressure, namely, an oil passage that supplies oil to an operating chamber and an oil passage that discharges oil from within the operating chamber. A separate oil passage is provided exclusively for lock-up control that controls the supply of hydraulic pressure to the servo oil chamber (refer to Japanese Patent No. 2641419).

The single-disc type of lock-up clutch has a simple structure and needs only two oil feed passages, which makes it advantageous in terms of circuit configuration. However, a corresponding increase in the clutch outer diameter is necessary in order to handle cases of greater torque. On the contrary, the multi-disc type of lock-up clutch is capable of transmitting torque through engagement of a number of friction plates, making it advantageous in terms of its capability to transmit a greater torque, while avoiding an increase in the size of the clutch outer diameter. However, the structure is complex and a complicated circuit configuration is unavoidable due to the necessity for three oil feed passages as mentioned above.

Furthermore, in the hydraulic circuit of the related art, it is necessary to dispose a control valve for controlling the torque converter, in addition to a control valve for controlling the lock-up clutch. This not only risks cost increases, but also requires an enlarged space for the circuit as well.

SUMMARY OF THE INVENTION

In view of the foregoing circumstances, it is a main object of the present invention to enable supply of circulating hydraulic pressure and control of a lock-up clutch in a hydraulic power transmission with the use of a simple circuit configuration.

Furthermore, providing a simple converting circuit between the hydraulic power transmission and the controlling hydraulic circuit allows for the compatibility of a common hydraulic circuit with different types of hydraulic power transmissions.

In the present invention, hydraulic pressure is supplied to a circulation oil passage and a lock-up oil passage from a common hydraulic pressure supply circuit, whereby a lock-up clutch can be engaged by hydraulic pressure supplied to a hydraulic power transmission chamber. Therefore, a hydraulic pressure supply circuit exclusively dedicated to lock-up clutch engagement can be eliminated so as to simplify the hydraulic circuit for hydraulic power transmission control.

The hydraulic pressure in the hydraulic power transmission chamber can also be made lower than the hydraulic pressure in the servo oil chamber, particularly in a structure where the circulation oil passage is connected to the hydraulic pressure supply circuit via an orifice. Therefore, it is possible to achieve lock-up without providing different pressure receiving areas in the servo piston or the like. Additionally, an amount of oil can be circulated during a lock-up OFF state in a structure where a check valve is provided in parallel with the orifice in the circulation oil passage.

A different type of hydraulic power transmission can be used without changing the valve body in which the hydraulic circuit is installed. This may be achieved by replacing only those elements that must be changed for practical reasons as a result of a change in the type of hydraulic power transmission, such as the oil pump and input shaft of the transmission supporting the hydraulic power transmission. In such a structure, the hydraulic power transmission shares the valve body of the automatic transmission or a speed-change mechanism of the automatic transmission, and the torque capacity of the hydraulic power transmission can thus be easily changed.

Also note that a converting circuit installed in the oil pump is one of the elements that must be replaced in accordance with the use of a different type of hydraulic power transmission, thereby allowing a more practical location of the converting circuit.

DETAILED DESCRIPTION OF THE PREFERRED EMBODIMENTS

Figure 1:
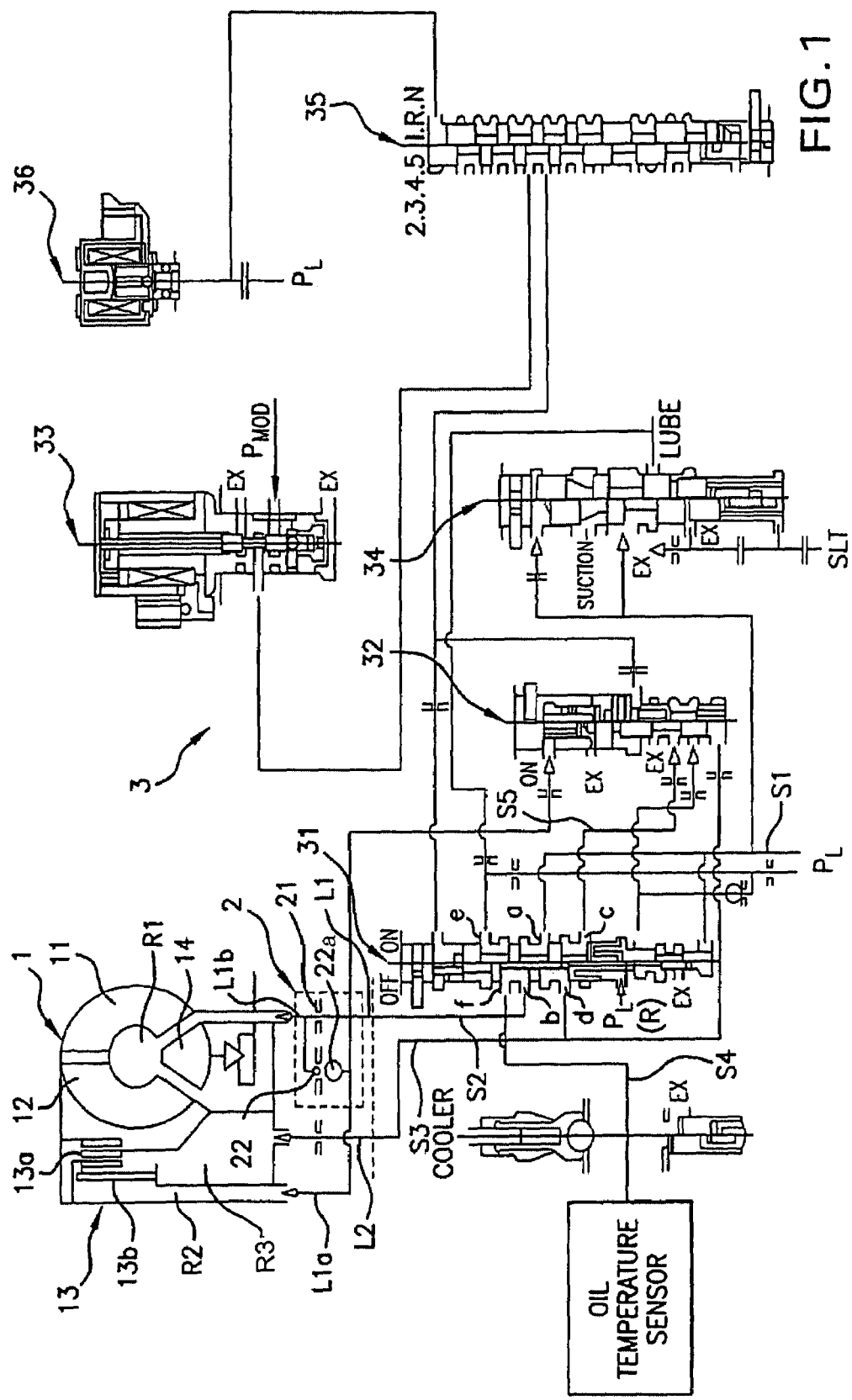
FIG. 1 is a hydraulic circuit diagram in an embodiment wherein the present invention is applied to a hydraulic power transmission that uses a multi-disc clutch as a lock-up clutch.

FIG. 1 shows a hydraulic circuit in an embodiment wherein a hydraulic power transmission has a lock-up clutch in the form of a multi-disc friction engagement element which is engaged and disengaged by a servo piston. As shown in the figure, a torque converter 1 serving as the hydraulic power transmission is provided with a pump impeller 11, a turbine runner 12, and a lock-up clutch 13. In addition, a friction engagement element 13a of the lock-up clutch 13 is disposed between a hydraulic power transmission chamber R1, which houses the pump impeller 11 and the turbine runner 12, and a servo oil chamber R2 of the lock-up clutch 13.

A circulation oil passage L1 supplies hydraulic pressure for lock-up to the servo oil chamber R2, and also supplies hydraulic pressure for circulation to the hydraulic power transmission chamber R1. Moreover, the circulation oil passage L1 communicates with one of two oil feed passages in the hydraulic pressure supply circuit, namely, a lock-up oil passage S2. Another oil passage for the hydraulic power transmission chamber R2, a lock-up oil passage L2, communicates with the other of the two oil feed passages in the hydraulic pressure supply circuit, namely, a circulation oil passage S3.

A converting circuit 2 is disposed within the circulation oil passage L1 to adapt the oil passage connection to a given type of lock-up clutch. The lock-up oil passage S2 branches in the converting circuit 2, and one branch communicates with the servo oil chamber R2 of the lock-up clutch 13, while the other branch communicates with the torque converter 1 via an orifice 21 ("first orifice") and a check valve 22, in parallel with the orifice 21, that prevents flow in the direction from the hydraulic pressure supply circuit S2 to the hydraulic power transmission chamber R1. In order to allow flow from the hydraulic power transmission chamber R1 to the hydraulic pressure supply circuit S2, the check valve 22 is provided with an orifice 22a ("second orifice") that has a bore diameter greater than that of the orifice 21.

A further description of the structure will be given below in detail. Provided in the torque converter 1 is a front cover and a torque converter cover. The front cover forms the servo oil chamber R2; the torque converter cover is joined integral with a rear cover that is integral with the pump impeller 11. Furthermore, the torque converter 1 is provided with a stator 14 that is disposed on an inner peripheral side between the pump impeller 11 formed integral with the rear cover and the opposing turbine runner 12.

Provided in the lock-up clutch 13 is a servo piston 13b and a friction engagement element 13a. The servo piston 13b is fit within the servo oil chamber R2 for movement relative thereto in the axial direction. The friction engagement element 13a is formed by combining a separator plate, whose outer peripheral side is in locked engagement with the front cover, and a friction disc whose inner peripheral side is in locked engagement with a turbine hub. In this structural relationship, hydraulic pressure from the hydraulic power transmission chamber R1 acts on the front face of the servo piston 13b, and hydraulic pressure from the servo oil chamber R2 acts on the back face.

A control circuit for the torque converter 1 regulates a circuit line pressure $P_L$ generated by a primary regulator valve (not shown), using a secondary pressure as reduced by a secondary regulator valve 34 as a base pressure. Reference numeral S1 in the figure denotes the oil passage for the secondary pressure. Furthermore, the control circuit for the torque converter 1 is composed mainly of a lock-up control valve 32 that controls discharge of pressure from the torque converter 1, a lock-up relay valve 31 that switches a hydraulic pressure supply to the torque converter 1, and a linear solenoid valve 33 for switching of the lock-up relay valve 31.

The lock-up relay valve 31 is a spool valve which switches between the upper position (left side in the drawing) by the application of a spool load on its lower end by a spring, and the lower position by the application of solenoid pressure output from the linear solenoid valve 33 to another spool end via a 1-2 shift valve 35. Six switch ports a to f are provided in the lock-up relay valve 31. Port "a" is connected with the secondary pressure oil passage S1 and is designated as an IN port. When the lock-up relay valve 31 is in its lower position, as shown in the right half of the figure, the IN port a communicates with the port b that is connected with the hydraulic pressure supply circuit S2; the port d that is connected to the other hydraulic pressure supply circuit S3 communicates with the port c that is connected with the IN port of the lock-up control valve 32; and the port e that is connected with a lubrication pressure circuit communicates with the port f that is connected to a cooler. When the lock-up relay valve 31 is in its raised position, as shown in the left half of the figure, the IN port a communicates with the port d, and the port b communicates with the port f.

The lock-up control valve 32 is a spool valve with a radial pressure receiving portion, and a spring load is applied to the end at the major diameter side of the spool via a plunger. Solenoid pressure from the linear solenoid valve 33 is applied to the radial pressure receiving portion via the 1-2 shift valve 35, similar to the lock-up relay valve. In addition, hydraulic pressure from the hydraulic pressure supply circuit S3 is applied to the end at the minor diameter side of the spool. Thus, the lock-up control valve 32 operates to regulate pressure by opposing the hydraulic pressure of the hydraulic pressure supply circuit S3, the solenoid pressure opposing the spring load and the hydraulic pressure of the hydraulic pressure supply circuit S2.

In the hydraulic circuit configured as described above, the lock-up relay valve 31 switches to the raised position shown in the left half of the figure when lock-up is OFF, in order to release hydraulic pressure from the pressure receiving area on the spool end through drain communication with the 1-2 shift valve 35. Thus, secondary pressure at the IN port a communicates with to the port d, and is supplied to the hydraulic power transmission chamber R1 of the torque converter 1 from the hydraulic pressure supply circuit S3. Furthermore, oil within the hydraulic pressure chamber R1 presses and opens the check valve 22 of the circulation oil passage L1, and is discharged to the hydraulic pressure supply circuit S2 via the major diameter orifice 22a. The oil is subsequently discharged to the cooler via the ports b, f of the lock-up relay valve 31. Such an oil flow thus achieves the lock-up OFF state. In this case, oil from the torque converter 1 is adequately discharged through the opening of the major diameter orifice 22a of the check valve 22, thereby ensuring considerable circulation.

It is possible to constantly apply output pressure from the linear solenoid valve 33 to the lock-up relay valve 31 via the 1-2 shift valve 35 when lock-up is on. In this case as well, the lock-up OFF state mentioned above, when there is no output from the linear solenoid valve 33, is maintained. But when output of the linear solenoid valve 33 is initiated, the lock-up relay valve 31 switches to the lower position in the right half of the figure. Thus, the secondary pressure of the IN port a is output from the hydraulic pressure supply circuit S2 to the circulation oil passage L1, and hydraulic pressure decreased by the check action of the check valve 22 is supplied to the hydraulic power transmission chamber R1 via the orifice 21. Meanwhile, the secondary pressure from the hydraulic pressure supply circuit S2 is also supplied unchanged to the servo oil chamber R2. In this manner, a pressure difference corresponding to the difference in orifice diameters is generated between the hydraulic pressure being supplied to the hydraulic power transmission chamber R1 and that supplied to the servo oil chamber R2 at the same time. Therefore, the lock-up piston 13b is pushed to the hydraulic power transmission chamber R1 side, resulting in the engagement of the friction engagement element 13a and thus achieving a lock-up ON state. It should be noted that in this lock-up ON state, oil on the hydraulic power transmission chamber R1 side is discharged to a discharge oil passage S5 via the ports d, c of the lock-up relay valve 31, and then drained via the lock-up control valve 32. A lock-up slip state can also be achieved by controlling, as necessary, the amount of drainage through the lock-up control valve 32.

As described above, in this embodiment, the hydraulic pressure supply circuit S2 leading to a lock-up clutch servo of the torque converter 1 branches off. Furthermore, the orifice 21 and the check valve 22 are both provided in a branched torque converter internal circulation circuit leading to the interior of the torque converter. For this reason, the check valve 22 is closed and hydraulic pressure is supplied via the orifice 21 in the lock-up ON state, which limits the flow and thus ensures a differential lock-up pressure. On the other hand, the check valve 22 is opened in the lock-up OFF state so that a large amount of oil flows therethrough to secure the required amount of lubrication.

In the above-described structure, a valve can be used in common to control both the lock-up ON pressure and the torque converter circulation pressure, resulting in one fewer control valve than the three lock-up circuits used in the related art. Consequently, a cost reduction can be achieved, with an advantage in terms of space, when assembling the valve body.

Figure 2:
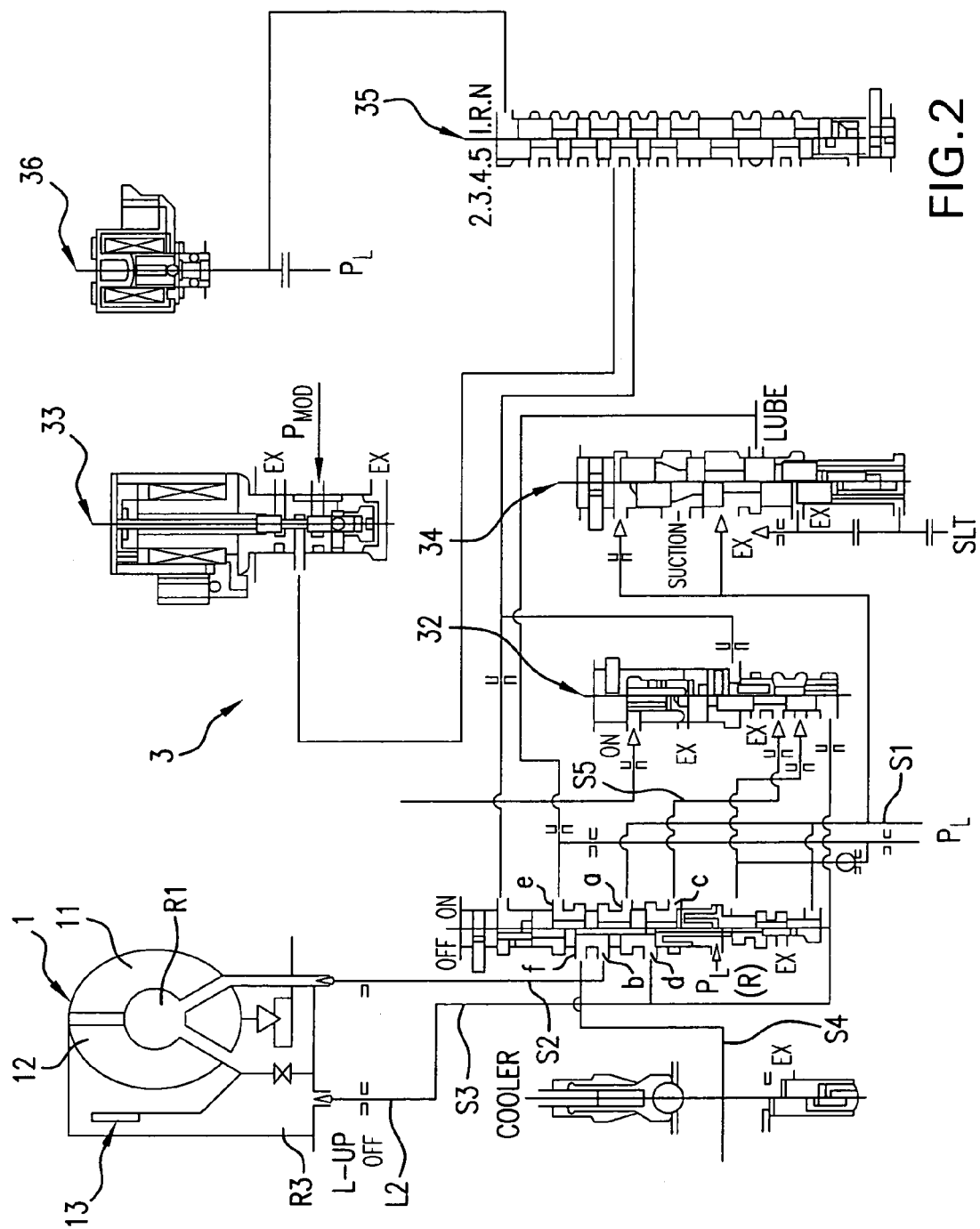
FIG. 2 is a hydraulic circuit diagram in an embodiment wherein the present invention is applied to a hydraulic power transmission that uses a single-disc clutch as a lock-up clutch.

FIG. 2 shows a hydraulic circuit of an embodiment of a hydraulic power transmission with a lock-up clutch in the form of a flexible single-disc clutch fixed to the turbine hub and which engages and disengages with the case of the hydraulic power transmission. The converting circuit 2 of the first embodiment is omitted. As shown in FIG. 2, the torque converter 1, serving as the hydraulic power transmission, is practically identical to that described in the previous embodiment, except for the type of lock-up clutch 13 used. The single-disc clutch in this embodiment is disposed on a hub of the turbine runner 12, and engages and disengages the front cover. A space between the front cover and the single-disc clutch is connected to the circulation oil passage S3 of the hydraulic circuit via the lock-up oil passage L2, and serves as an oil chamber R3 that supplies hydraulic pressure in the lock-up OFF state.

In the circuit of this embodiment, the circulation oil passage L1 supplies hydraulic pressure for lock-up to the hydraulic power transmission chamber R1, and the lock-up oil passage L2 supplies hydraulic pressure to the oil chamber R3. The oil passages L1 and L2 are directly connected to the lock-up oil passage S2 and the circulation oil passage S3, respectively.

The control circuit of the torque converter 1 is installed within a valve body 3 and is completely identical to that shown in FIG. 1. Therefore like reference numerals are used for like elements and corresponding description will not be repeated.

In the hydraulic circuit, the lock-up relay valve 31 switches to the raised position shown in the left half of the figure when lock-up is OFF, in order to release hydraulic pressure from the pressure receiving portion on the spool end through drain communication with the 1-2 shift valve 35. Thus, secondary pressure of the IN port a is connected to the port d, and supplied to the lock-up OFF oil chamber R3 of the torque converter 1 from the circulation oil passage S3. Furthermore, oil entering the hydraulic power transmission chamber R1 from the lock-up OFF oil chamber R3 is discharged to the hydraulic pressure supply circuit S2. The oil is subsequently discharged to the cooler via the ports b, f of the lock-up relay valve 31. Such an oil flow thus achieves the lock-up OFF state. In this case, the discharge of oil from the torque converter 1 is adequately provided for through the major diameter orifice, thereby ensuring considerable circulation.

It is possible to constantly apply output pressure from the linear solenoid valve 33 to the lock-up relay valve 31 via the 1-2 shift valve 35 to maintain the lock-up OFF state mentioned above when there is no output from the linear solenoid valve 33. But when output of the linear solenoid valve 33 is initiated, the lock-up relay valve 31 switches to the lower position in the right half of the figure. Thus, the secondary pressure of the IN port a is output from the lock-up oil passage S2 to the circulation oil passage L1, and hydraulic pressure is supplied to the hydraulic power transmission chamber R1. In this manner, hydraulic pressure supplied to the hydraulic power transmission chamber R1 engages the single-disc clutch with the case, thus achieving a lock-up ON state. In this lock-up ON state, oil on the hydraulic power transmission chamber R1 side is gradually discharged to the circulation oil passage S3 via an orifice formed in the turbine hub. Thereafter, the oil is discharged to the discharge oil passage S5 via the ports d, c of the lock-up relay valve 31, and then drained via the lock-up control valve 32. In this case as well, a lock-up slip state can be achieved by controlling the amount of drainage, as necessary, through the lock-up control valve 32.

As described above, the hydraulic circuit for a torque converter with a different type of lock-up clutch is also capable of executing the exact same hydraulic pressure control for executing lock-up ON/OFF and slip controls. Hence, the circuit portion installed in the valve body 3 is also completely identical for both circuits. In the first embodiment (FIG. 1), by providing a circuit compatible with two and three sets of oil passages as the converting circuit 2 on a communicating oil passage portion connecting the torque converter 1 and the valve body 3, the valve body 3 becomes compatible with torque converters using different types of lock-up clutches.

To provide the foregoing advantage, the first embodiment (FIG. 1) has the converting circuit 2 disposed outside the valve body 3. The converting circuit 2 in such a case is capable of being disposed in an appropriate region, taking into account the extremely small size of the space mentioned earlier between the branched oil passages, specifically, the orifice 21 is disposed in one of the branched passages and the check valve 22 disposed in the other. However, a more specific and realistic approach may entail disposing the converting circuit 2 on the transmission case or an accompanying oil pump case.

Figure 3:
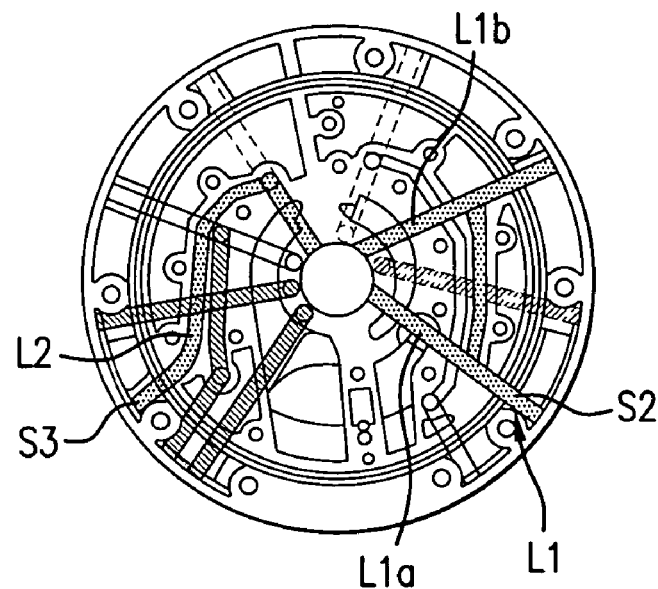
FIG. 3 is a front view of an oil pump with a built-in converting circuit for a multi-disc clutch.

FIG. 3 shows an example of specific locations for the orifice 21 and the check valve 22 of the converting circuit 2. In this example, the orifice 21 and the check valve 22 are provided by using the case of an oil pump 5, which is normally disposed on the automatic transmission, as a partition to separate the transmission case from a torque converter housing.

FIG. 3 shows an arrangement of the oil passages in a front view of the case of the oil pump 5 (that excludes an oil pump body). As shown in the figure, the circulation oil passage L1 connecting to the lock-up oil passage S2 at the outer periphery branches off, and a communicating oil passage extending radially straight from the branch point up to a central axis is designated as a circulation oil passage L1a leading to the servo oil chamber. A branched portion of the circulation oil passage L1 extends circumferentially to connect with a circulation oil passage L1b disposed in a different location radiating from the center. The orifice 21 and the check valve 22 overlap in the direction of the case thickness where the circulation oil passage L1 connects to the circulation oil passage L1b. According to this arrangement, the orifice 21 and the check valve 22 are installed within the case of the oil pump 5 and therefore do not require a separate, dedicated space. The communicating oil passage also extends to the axis at a position different from that of the circulation oil passage L1a leading to the servo oil chamber. The lock-up oil passage L2 connected to the circulation oil passage S3 near the outer periphery bends to extend circumferentially, and is connected to an oil passage concentric with the axis.

Figure 4:
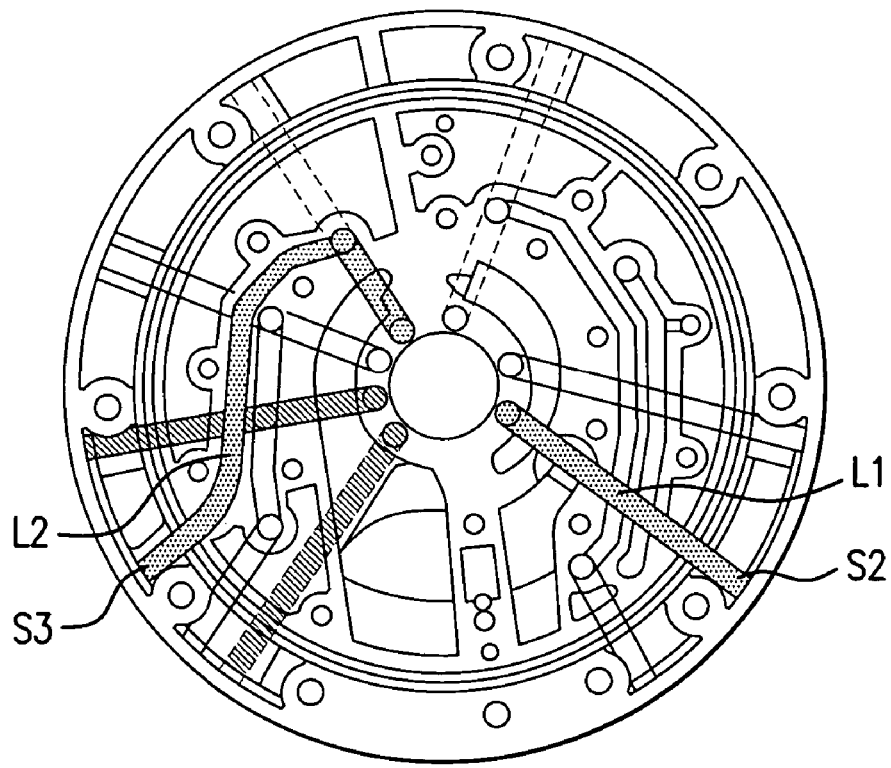
FIG. 4 is a front view of an oil pump with a built-in converting circuit for a single-disc clutch.

FIG. 4, on the other hand, shows an arrangement of the oil passages in a front view of the case of an oil pump (that excludes the oil pump body) lacking the converting circuit. As shown in the figure, the circulation oil passage L1 connecting to the lock-up oil passage S2 at the outer periphery extends straight up to the axis. Additionally, the communicating oil passage L2 connected to the circulation oil passage S3 at the outer periphery bends to extend circumferentially, and is connected to an oil passage concentric with the axis.

Figure 5A:
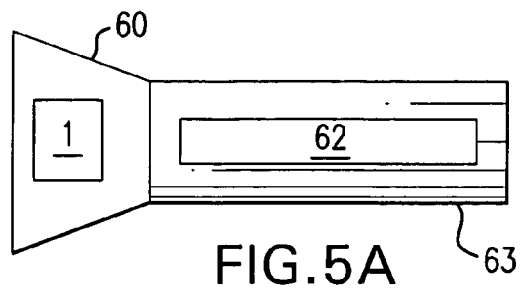
FIG. 5A is a side view of an automatic transmission in accordance with the present invention.
Figure 5B:
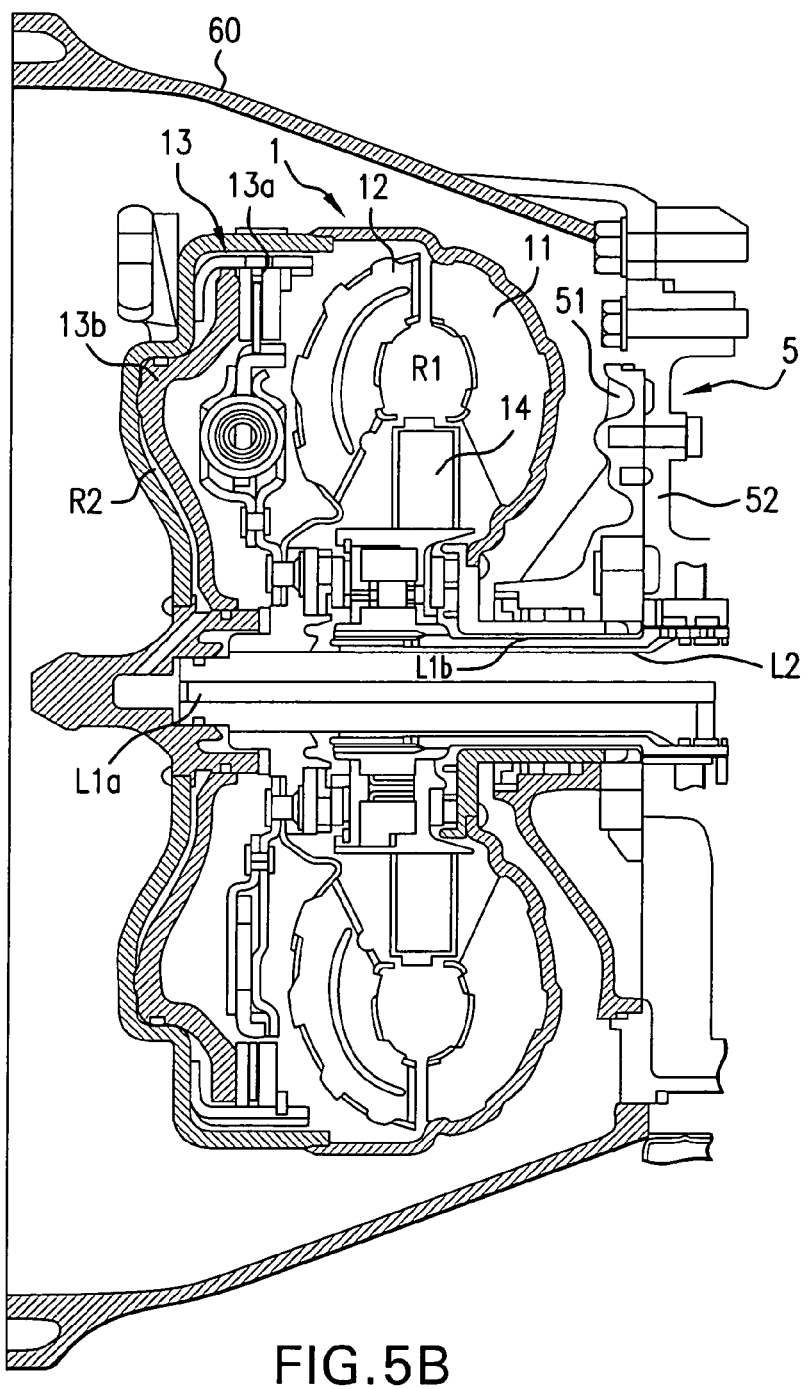
FIG. 5B is a cross-sectional view of the front portion of the automatic transmission of FIG. 5A that includes a hydraulic power transmission using a multi-disc clutch as a lock-up clutch.

FIG. 5A depicts the torque converter (hydraulic transmission) 1 housed within a torque converter housing 60 and attached to a speed-change mechanism 62 housed within a transmission case 63. FIG. 5B shows a cross section of only a front portion of the automatic transmission provided with a torque converter 1 using a multi-disc clutch as a lock-up clutch. Description of elements previously described shown in this cross-sectional view will not be repeated and like reference numerals used for like elements. Oil passage structures not shown in the circuit diagram will be explained below.

As shown in FIG. 5B, the circulation oil passage L1a previously described with reference to FIG. 3 extends along the axis of an input shaft and connects with an oil passage extending radially through the input shaft. The circulation oil passage L1a also communicates with the servo oil chamber from an axial end (left end in drawing) via an oil passage in the front cover of the torque converter. Furthermore, the circulation oil passage L1b communicates with the hydraulic power transmission chamber R1 through a space between an impeller hub shaft of the torque converter and the stator shaft at the inner periphery. The lock-up oil passage L2 communicates with an oil passage concentric with the axis of the oil pump case through a space between the stator shaft and the input shaft. The oil pump 5 includes an oil pump case 51, pump gears accommodated therein and an oil pump cover 52 covering the open face of the case 51.

Figure 6:
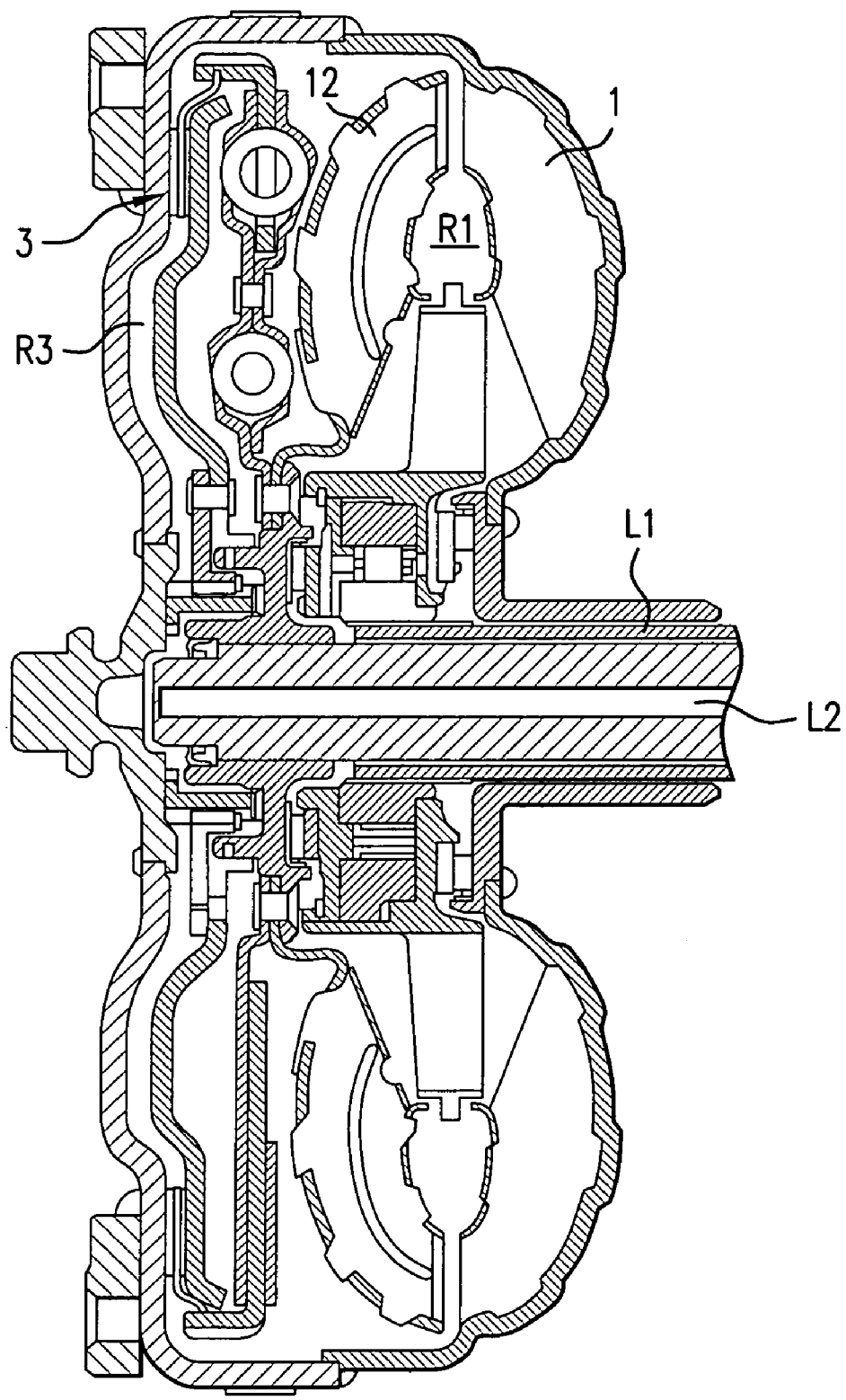
FIG. 6 is a cross-sectional view of a front portion of an automatic transmission that includes a hydraulic power transmission using a single-disc clutch as a lock-up clutch.

FIG. 6 shows a cross section of only a front portion of the automatic transmission provided with a torque converter using a single-disc clutch as a lock-up clutch. In this case as well, descriptions for previously described elements shown in this cross-sectional view will not be repeated and like reference numerals are used for like elements. Oil passage structures not shown in the circuit diagram will be explained below.

The lock-up oil passage L2 previously described with reference to FIG. 4 extends axially through the input shaft of the transmission. The lock-up oil passage L2 also communicates from an axial end with the lock-up OFF oil chamber R3 located between the single-disc clutch and the front cover of the torque converter. In addition, the circulation oil passage L1 communicates with an oil passage concentric with the axis of the oil pump case through a space between the stator shaft and an impeller hub shaft.

As evident from the above description of preferred embodiments, the valve body in which the hydraulic circuit is installed need not be modified for compatibility with different types of torque converters. Instead, a converting circuit can be installed in or removed from the oil, pump, as necessary and the input shaft of the transmission can be modified in accordance with the type of torque converter.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A hydraulic circuit of a hydraulic power transmission having a pump impeller, a turbine runner, a lock-up clutch and a hydraulic power transmission chamber (R1) housing the pump impeller and the turbine runner, said hydraulic circuit comprising: a servo oil chamber for operation of the lock-up clutch isolated from the hydraulic power transmission chamber; a lock-up oil passage (L1a) that supplies hydraulic pressure for lock-up to the servo oil chamber and is connected to a common hydraulic pressure supply circuit (L1); and a circulation oil passage (L1b) that supplies hydraulic pressure for circulation to the hydraulic power transmission chamber and is connected in common with said lock-up oil passage to said common hydraulic pressure supply circuit through a first orifice and through a check valve in parallel with said first orifice, said check valve preventing flow from the common hydraulic pressure supply circuit to the hydraulic power transmission chamber.

2. The hydraulic circuit of a hydraulic power transmission according to claim 1, wherein hydraulic pressure for lock-up which is supplied from a supply valve to the servo oil chamber via the common hydraulic pressure supply circuit is also supplied to the hydraulic power transmission chamber via said common hydraulic pressure supply circuit while the lock-up clutch is engaged.

3. The hydraulic circuit of a hydraulic power transmission according to claim 1, wherein the hydraulic pressure for lock-up supplied to said servo oil chamber is a secondary pressure from a regulator valve, and in addition to the secondary pressure being supplied to the servo oil chamber and the hydraulic power transmission chamber via the common hydraulic pressure supply circuit, hydraulic pressure supplied to said servo oil chamber is reduced through regulation of the pressure of oil circulating in the hydraulic power transmission chamber by a regulating valve.

4. The hydraulic circuit of a hydraulic power transmission according to claim 1, wherein the check valve allows flow from the hydraulic power transmission chamber to the common hydraulic pressure supply circuit through a second orifice that is larger than the first orifice.

5. The hydraulic circuit of a hydraulic power transmission according to claim 4, wherein hydraulic pressure is supplied to the hydraulic power transmission chamber via another hydraulic pressure supply circuit, and oil that has circulated through the hydraulic power transmission chamber is sent to a cooler via the check valve and a lock-up relay valve while the lock-up clutch is released.

6. The hydraulic circuit of a hydraulic power transmission according to claim 4, wherein the hydraulic power transmission is located sandwiched between an oil pump and a speed-change mechanism of an automatic transmission, and the check valve and the second orifice are disposed in at least one of an oil pump case, an oil pump cover, and a transmission case.

7. The hydraulic circuit of a hydraulic power transmission according to claim 1, wherein hydraulic pressure is supplied to the hydraulic power transmission chamber via another hydraulic pressure supply circuit, and oil that has circulated through the hydraulic power transmission chamber is sent to a cooler via the check valve and a lock-up relay valve while the lock-up clutch is released.

8. The hydraulic circuit of a hydraulic power transmission according to claim 1, wherein the hydraulic power transmission is located sandwiched between an oil pump and a speed-change mechanism of an automatic transmission, and the check valve and the second orifice are disposed in at least one of an oil pump case, an oil pump cover, and a transmission case.

9. The hydraulic control unit of a hydraulic power transmission according to claim 8, wherein the hydraulic pressure supply circuit is provided with two oil feed passages, and at least one of the two oil feed passages branches into two oil passages in a converting circuit.

10. The hydraulic control unit of a hydraulic power transmission according to claim 9, wherein the lock-up oil passage branches within the converting circuit, with one branch connected to a servo oil chamber of the lock-up clutch, and another branch connected to the hydraulic power transmission chamber via said first orifice and via said a check valve in parallel with said first orifice.

11. The hydraulic control unit of a hydraulic power transmission according to claim 9, wherein the converting circuit is installed on or in one of a transmission case, an oil pump case and an oil pump cover of an oil pump serving as a hydraulic pressure source for the hydraulic pressure supply circuit.

* * * * *